Figure 1:
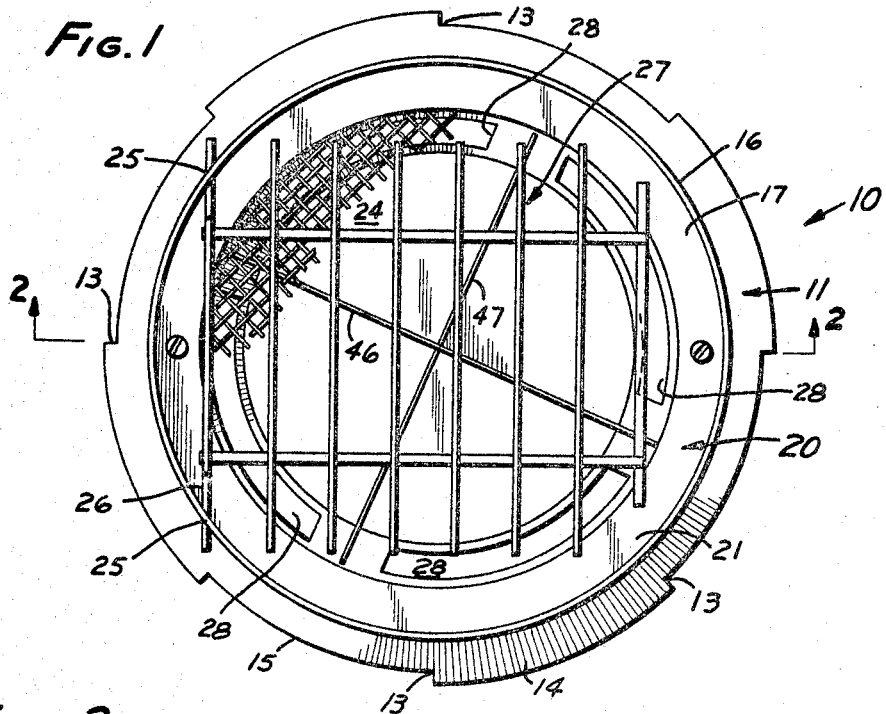

Sept. 6, 1966  C. S. HORINE  3,270,737
COOKING STOVE
Filed April 1, 1964

INVENTOR.
CONRAD S. HORINE
BY
ATTORNEYS.

United States Patent Office 3,270,737
Patented Sept. 6, 1966

3,270,737
COOKING STOVE
Conrad S. Horine, 629 Echo St., Anaheim, Calif.
Filed Apr. 1, 1964, Ser. No. 356,522
4 Claims. (Cl. 126—25)

This invention relates to a cooking stove which is especially adapted for cooking with charcoal.

In recent years, as the use of national forests, especially those which are located close to population centers, has increased, the supply of natural firewood at campgrounds has become more and more scarce. This fact, coupled with the fire danger from flying embers and the inconvenience of blackened pans, has spurred the use of a more compact fuel which would eliminate the objectionable features of wood and which would preferably be light enough that it can be packed into a campground without undue inconvenience. In fact, the Boy Scouts of America have adopted the national policy to encourage the use of charcoal in cooking at camp.

The use of charcoal as a camp fuel has involved a number of difficulties even greater than those found in connection with cooking with wood, even though, if used optimally, charcoal would be a superior fuel in many ways. For example, it is difficult to start a charcoal fire without using an inflammable liquid. Because carrying inflammable liquids on hikes is hazardous, this is frequently prohibited and therefore it has been necessary to find different means for starting the charcoal fire, such as wood, which is scarce enough already. Still another problem involved in the use of charcoal is that presently existing charcoal stoves have not been able to produce a sufficient heat to boil water, fry bacon, or cook a meal. It is evident that a stove which will not perform these functions is essentially useless.

It is an object of this invention to provide a stove which will boil water and cook with efficiencies at least equal to the middle range of heat on a gas range in a home, fry bacon, cook a meal, and heat clean-up water. The foregoing may be accomplished with as few as ten normal size charcoal briquets in the stove of the instant invention.

It is another object of this invention to provide a charcoal starter which is clean, reliable and safe, and which does not utilize inflammable liquids. A charcoal fire, using a starter according to this invention is ready for cooking in about ten to fifteen minutes, which is about the same length of time as it takes to chop, lay and light a wood fire.

It is a further object of this invention to reduce the amount of charcoal which is required for cooking a meal. It has heretofore been found that on open stoves, it is necessary to utilize about five pounds of charcoal for a single meal if the fire is to be sufficient to cook the meal. This inefficient use of charcoal requires carrying several large sacks of charcoal to camp in order to cook for ten or twelve people on an average weekend outing.

The stove of the instant invention utilizes only about ten briquets to cook an entire meal. It burns them with such efficiency that the bed of charcoal is so hot that a small blue flame can be seen flickering across the top of the charcoal bed. Furthermore, the fire is quickly ready, accomplishes its cooking function, and heats water for clean-up, with such a small number of briquets.

A cooking stove according to this invention comprises an outer shell which has an interior peripheral wall, an inner guide having an outer and an interior peripheral wall, the interior peripheral wall forming an upwardly opening cooking region, the outer shell and inner guide being joined at a peripheral joint which is substantially fluid-tight. The inner guide has an inlet port therethrough which is disposed beneath the level of the fuel. An outer guide extends upwardly between the outer shell and the inner guide. The interior peripheral wall of the outer shell and the outer peripheral wall of the inner guide form, on each side of the outer guide, an inverted passage which opens into said cooking region through the inlet port.

A fuel support grid is provided in said cooking region of the inlet port, this grid being adapted to support fuel to be burned for cooking. The fuel utilizes air for combustion from the inlet port. The inner guide and the grid are exposed to each other, whereby radiation from fuel on the grids heats the inner guide, and the inner guide radiates energy to heat the outer guide, both guides thereby serving to preheat the air which passes through the inverted passage and inlet port to the cooking region.

According to a preferred but optional feature of this invention, the outer shell includes a leg which spaces at least a portion of the lower edge of the outer shell from a supporting surface, thereby to form an intake port between the outer shell and the outer guide.

According to still another preferred but optional feature of this invention, the inner and outer guides are substantially bowl-shaped, each having a central section, the central sections being joined by a fastener.

Figure 2:
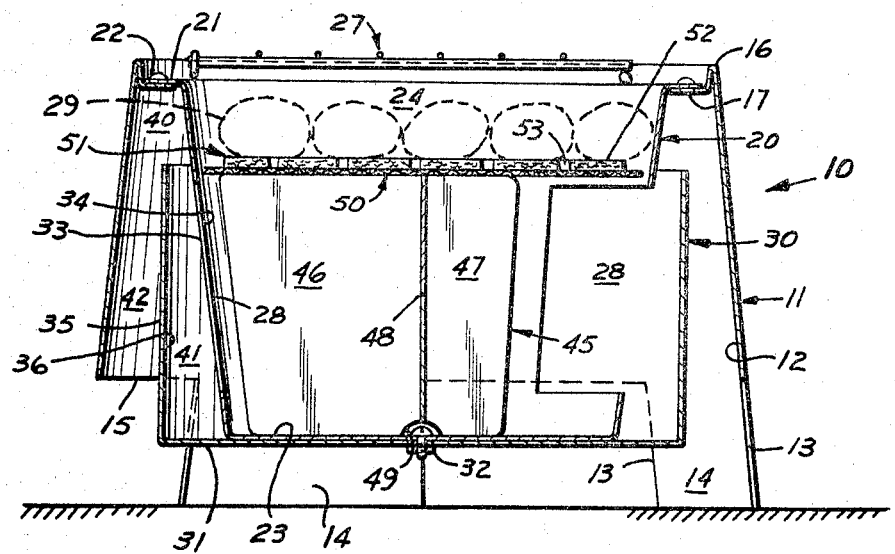

The above and other features of this invention will be fully understood from the following detailed description and the accompanying drawings in which:

FIG. 1 is a top view of the presently preferred embodiment of the invention; and FIG. 2 is a cross-section taken at line 2—2 of FIG. 1.

Cooking stove 10 includes an outer shell 11 having an interior peripheral wall 12. The inner and outer walls of the outer shell are preferably frusto-conical, and the lower edge of the outer shell is preferably provided with four notches 13, which form legs 14. The legs space the edges 15 from the ground, thereby forming intake ports at the notches. It is obvious that separate legs, such as posts, could be used instead, but for purposes of packing the stove on the sack, a unitary structure such as that shown is usually to be preferred.

Upper edge 16 of the outer shell steps down to form a shelf 17 which supports an inner guide 20. The inner guide 20 has an outer flange 21 which rests atop shelf 17. The inner guide and outer shell might, if preferred, be a single continuous structure. However, for general convenience of manufacture, it will usually be preferred to make these as two separate parts, and to join them by fasteners 22. The inner guide extends downwardly and tapers inwardly as it extends downwardly. It has a bottom surface 23, and forms an upwardly opening cooking region 24 near upper edge 16.

Holes 25 are formed in the edge of the outer shell to receive rod 26. Rod 26 forms a portion of a cooking grill 27. The opposite end of the cooking grill from rod 26 rests on shelf 17. The spacing-apart of holes 25 and the length of rod 26 are selected so that the grill can be removed simply by shifting rod 26 longitudinally until one end leaves one of the holes 25, then tilting the grill and pulling the other end of the rod out of the other hole 25.

Four inlet ports 28 are formed in the sidewall of the inner guide below the level of fuel 29.

An outer guide 30 is substantially cup-shaped, having a solid bottom 31 in flush abutment with the bottom of the inner guide. The outer guide and inner guide are conveniently joined together by a separable fastener 32 at their centers. This fastener may conveniently be a nut and a bolt.

The inner guide has an outer and an inner peripheral wall 33, 34, respectively. The outer guide has an outer and inner peripheral wall 35, 36, respectively. The outer shell and inner guide meet to form a continuous structure having an inverted U-shaped in cross-section. The peripheral walls of the outer guide extend upwardly into this inverted passage 40 so as to form it into inner and outer channels 41, 42, respectively, the flow through which begins at the intake ports, proceeds upwardly through outer channel 42, downwardly through inner channel 41, and then into the cooking region through inlet ports 28.

Support means 45 preferably comprising a pair of plates 46, 47 each having a notch 48, is made into a cruciform structure by passing the notches over each other as in a common egg-separator construction. A cutout 49 clears the fastener 32. On the upper edge of the support means rests a fuel support grid 50 which may conveniently comprise a piece of heavy screening.

For starting purposes, a fuel starter 51 is placed atop the fuel support grid. This fuel starter comprises a piece of corrugated cardboard 52 with a plurality of holes 53 therein. It is preferably slightly smaller in dimensions than the dimensions of the grid and is saturated with a substantially dry combustible wax. The presently preferred wax substance is white scale wax 128–130, made and sold by the Standard Oil Company of California. This is a common paraffin wax which burns with the cardboard, much as a candle, thereby providing a burning plate of considerable heat.

Fuel 29, such as a plurality of charcoal briquets, is placed atop the starter. The starter burns away after a few minutes, leaving the briquets exposed to additional air flow from below.

The stove structure is preferably made of metal, preferably a lightweight metal such as aluminum. The fuel support and grid will preferably be made of stainless steel. The stove achieves a major portion of its enhanced efficiency by virtue of the preheating of the air which enters it. The inner grid and inner guide are directly exposed to each other so that radiant energy from the briquets is transmitted to the inner guide which re-radiates a substantial portion of it to the outer guide. Also, in the preferred embodiment of the invention, a significant amount of radiation passes through the inlet ports directly to the outer guide. It will thereby be seen that two surfaces of the outer guide and one surface of the inner guide serve to preheat the air as it enters the stove, which results in a substantial improvement in the efficiency of operation.

It will also be noted that cold air flows over the inner peripheral wall of the outer shell, keeping it cool. This outer shell remains cool to the hand, and does not constitute any danger to the user or to surfaces on which it is placed.

In the preferred embodiment of the invention, the distance across the inside opening of the inner guide is approximately eight inches, and the inner guide is approximately 3.3 inches deep. The level of the grid is set so that a standard briquet will stand approximately one-half inch below the cooking grill at the start.

The aforesaid stove dimensions have been made as small as possible, both in physical dimensions and weight, and its final size is dictated by the size of a standard Boy Scout patrol cook kit. The resultant stove weighs less than a pound, and is small, compact, lightweight, efficient, and easily packed to camp.

In working tests, this stove with an initial charge of ten briquets was started by using the impregnated cardboard starter as aforesaid, and it takes between ten and fifteen minutes for the charcoal to be ignited sufficiently to start cooking. It has then been found that two quarts of water, initially at the temperature of a cold stream, boils in about twenty minutes. That is, from the time the stove is initially lit until two quarts of boiling water are available, is usually about thirty to thirty-five minutes.

Another test has been made in which a large pot of stew has been prepared sufficient to feed ten adults. Prefrying the meat and preparing the vegetables required about one-half hour. When the stew was prepared, and the pot was covered with a lid, six fresh briquets were added to the stove, and the pot left to boil. Without any further attention, the stew was completely cooked in forty-five minutes, and adequate coals were left for heating clean-up water.

This general stove construction is also suitable for use with a single briquet for purposes such as heating C-rations. For such uses, the stove is merely scaled down in size.

In summary, this stove will boil and fry food as quickly as the medium burners of a gas stove, which is an objective heretofore not attainable with charcoal cooking. The stove weights less than one pound and uses less than one pound of charcoal to cook a major meal and heat clean-up water. It can be set up with coals ready for cooking in ten to fifteen minutes, and the undersurface of the stove never becomes hot enough to damage a camp box or a picnic table.

It is theorized that at least a part of the effectiveness of this stove resides in the preheating of the air. It will be recognized that the inlet air is heated by both surfaces of the outer guide and by the inner surface of the inner guide, all of which surfaces are heated by radiation and re-radiation from the coals themselves. Thus, there is a bootstrap effect in the stove which renders the stove very efficient and economical in the consumption of fuel. This economy renders less onerous the burden of carrying one's own fuel and speeds the cooking process.

This invention is not to be limited by the embodiment shown in the drawings and described in the description which is given by way of example and not of limitation, but only in accordance with the scope of the appended claims.

I claim:

1. A generally circular cooking stove having a central axis of symmetry, and comprising: an outer shell having an interior peripheral wall; an inner guide having an outer and an interior peripheral wall, its interior peripheral wall forming an upwardly opening cooking region, the outer shell and the inner guide being joined at a joint which is substantially fluid-tight, the inner guide also having a plurality of inlet ports therethrough; an outer guide extending upwardly between the outer shell and the inner guide, and spaced therefrom so as to leave a clearance for air flow; the shell, guides, and walls being surfaces of revolution concentric on said axis, the interior peripheral wall of the outer shell and the outer peripheral wall of the inner guide forming on each side of and with the outer guide a passage which is a volume of revolution concentric on said axis which is open at its two lower ends and closed at its upper extreme, and which opens into said cooking region through the inlet ports; a fuel support grid in said cooking region above the inlet ports, said grid being adapted to support fuel to be burned for cooking, using air from the inlet ports for combustion, the inner guide and grid being exposed to each other, whereby radiation from fuel on the grid heats said inner guide, and the inner guide radiates energy to heat the outer guide, both guides thereby serving to heat air which passes through the inverted passage and inlet ports to the cooking region, said inlet ports lying between the grid and the outer guide whereby radiated energy from fuel on the grid passes through the inlet ports and impinges on the outer guide to heat the same and thereby to heat air flowing through said inverted passage.

2. A cooking stove according to claim 1 in which the outer shell includes a leg which spaces at least a portion of the lower edge of the outer shell from a supporting surface, thereby to form an intake port between the outer shell and outer guide.

3. A cooking stove according to claim 1 in which the inner and outer guides are substantially bowl-shaped, each having a central section, said central sections being joined by a fastener.

4. A cooking stove according to claim 1 in which a fuel starter rests atop the fuel support grid, said starter comprising a sheet of cardboard impregnated with paraffin.

References Cited by the Examiner

UNITED STATES PATENTS

| | | | |
|---|---|---|---|
| 97,731 | 12/1869 | Vedder | 126—15 |
| 686,634 | 11/1901 | Ohnemus | 126—15 |
| 1,549,916 | 8/1925 | Hepworth | 126—15 |
| 1,817,458 | 8/1931 | Munchow | 44—41 |
| 2,811,428 | 10/1957 | Smith | 44—41 |
| 3,051,159 | 4/1962 | Hardy | 126—25 |
| 3,082,757 | 3/1963 | Hohe | 126—25 |

FOREIGN PATENTS 363,224  11/1922  Germany.

FREDERICK L. MATTESON, JR., *Primary Examiner.*

JAMES W. WESTHAVER, *Examiner.*

E. G. FAVORS, *Assistant Examiner.*